(12) United States Patent
Kamei

(10) Patent No.: US 8,940,990 B2
(45) Date of Patent: Jan. 27, 2015

(54) EXERCISE MUSIC SUPPORT APPARATUS

(71) Applicant: Masahiro Kamei, Nagoya (JP)

(72) Inventor: Masahiro Kamei, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 24 days.

(21) Appl. No.: 13/801,577

(22) Filed: Mar. 13, 2013

(65) Prior Publication Data

US 2013/0242190 A1    Sep. 19, 2013

(30) Foreign Application Priority Data

Mar. 19, 2012   (JP) .................................. 2012-061613

(51) Int. Cl.
```
G10H 7/00      (2006.01)
H04N 5/06      (2006.01)
H04N 5/783     (2006.01)
H04N 9/806     (2006.01)
```

(52) U.S. Cl.
CPC ................. *H04N 5/06* (2013.01); *H04N 5/783* (2013.01); *H04N 9/806* (2013.01)
USPC .......................................................... 84/612

(58) Field of Classification Search
CPC .................. A63B 71/0686; A63B 2071/0625; G10H 2220/371
USPC ................ 482/3–9, 900, 901; 84/612; 700/94
See application file for complete search history.

(56) References Cited

U.S. PATENT DOCUMENTS

| | | | | |
|---|---|---|---|---|
| 8,153,880 B2* | 4/2012 | Sasaki | ............................. | 84/612 |
| 8,212,136 B2* | 7/2012 | Shirai et al. | .................... | 84/612 |
| 8,269,092 B2* | 9/2012 | Terauchi et al. | ................ | 84/610 |
| 8,355,520 B2* | 1/2013 | Ito | ................................. | 381/334 |
| 2004/0143193 A1* | 7/2004 | Nissila | ............................. | 600/519 |
| 2009/0158920 A1* | 6/2009 | Itami | ............................... | 84/645 |
| 2011/0021318 A1* | 1/2011 | Lumsden et al. | ................ | 482/8 |

FOREIGN PATENT DOCUMENTS

JP     2010-227173 A    10/2010

* cited by examiner

*Primary Examiner* — Jeffrey Donels
(74) *Attorney, Agent, or Firm* — Scully, Scott, Murphy & Presser, PC

(57) ABSTRACT

An apparatus temporal stops to output an exercise video, in response to determining that the request for temporal stop is received. The apparatus changes to a second audio volume of MIDI data by decreasing first audio volume by a pre-determined value and to a second exercise tempo by decreasing first exercise tempo by a pre-determined tempo value, in response to determining that a request for the temporal stop is received. The apparatus changes the second audio volume to the first audio volume, and the second exercise tempo to the first exercise tempo, in response to determining that a request for cancelling temporal stop is received. The apparatus restarts to output the exercise video representing the exercise motion based on the first exercise tempo.

15 Claims, 14 Drawing Sheets

Fig.3

| motion information | exercise tempo | repetition number | music information |
|---|---|---|---|
| march | 120 | 4 | TT |
| knee-up | 120 | 4 | |
| side-step | 120 | 8 | MM |
| chest press | 120 | 8 | |
| back lounge | 120 | 8 | |
| knee-up | 60 | 4 | CC |
| knee-up | 60 | 4 | |

Fig.6

|     |              | X  | Y  | Z  |
|-----|--------------|----|----|----|
| P1  | HEAD         | 15 | 10 | 30 |
| P2  | NECK         | 15 | 10 | 25 |
| P3  | CHEST        | 15 | 10 | 20 |
| P4  | LEFT SHOULDER| 20 | 10 | 15 |
| P5  | LEFT ELBOW   | 25 | 10 | 15 |
| P6  | LEFT HAND    | 30 | 10 | 12 |
| P7  | RIGHT SHOULDER| 10| 10 | 15 |
| P8  | RIGHT ELBOW  | 5  | 10 | 15 |
| P9  | RIGHT HAND   | 0  | 10 | 12 |
| P10 | PIT OF STOMACH| 15| 10 | 12 |
| P11 | LOWER BACK   | 15 | 10 | 10 |
| P12 | LEFT KNEE    | 22 | 10 | 5  |
| P13 | LEFT HEEL    | 22 | 10 | 0  |
| P14 | LEFT TOE     | 22 | 10 | 0  |
| P15 | RIGHT KNEE   | 8  | 10 | 0  |
| P16 | RIGHT HEEL   | 8  | 10 | 0  |
| P17 | RIGHT TOE    | 8  | 10 | 0  |

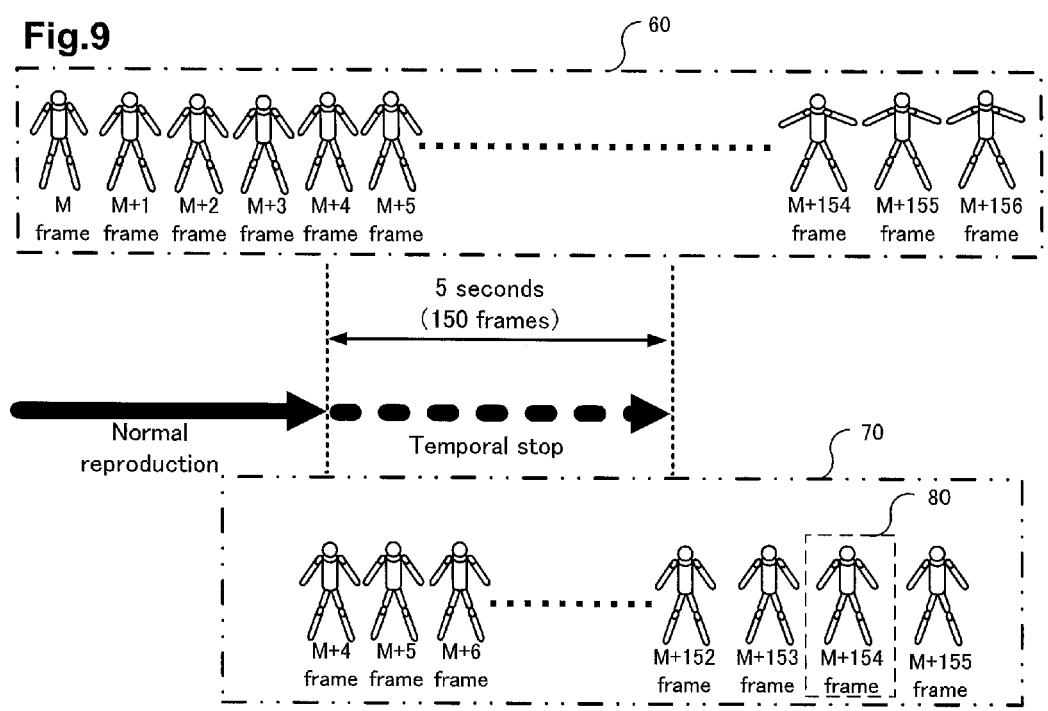

EXERCISE MUSIC SUPPORT APPARATUS

CROSS-REFERENCE TO RELATED APPLICATION

This application claims priority from Japanese Patent Application No. 2012-061613, filed on Mar. 19, 2012, the disclosure of which is incorporated herein by reference.

BACKGROUND OF THE DISCLOSURE

1. Field of the Disclosure

The present disclosure relates to an exercise support apparatus. Specifically, the present disclosure relates to a technique of supporting exercise by operating images of exercise to music.

2. Description of the Related Art

Conventionally, an exercise support system is known. The exercise support system supports a user to exercise while the user listens to music suitable for an exercise tempo. For example, a technique of changing an output speed of exercise video and music by changing an exercise tempo has been disclosed. Note that the exercise tempo represents a speed of performance of a certain exercise. Conventionally, when the exercise video and the music are output in accordance with a certain exercise tempo, the exercise tempo can be changed. By this, the exercise can be continued while the exercise tempo is arbitrarily changed in the course of the exercise.

In general, when Musical Instrument Digital Interface (MIDI) data is output as music, parameters such as note-on and note-off of the MIDI data are used. By the parameters of note-on and note-off, on and off of output of sounds of music are controlled. Therefore, when music is output using MIDI data, a parameter to be obtained after a predetermined period of time from a current reproducing position should also be temporarily stored in storage means such as a RAM.

Meanwhile, there is a demand for a temporal stop of output of exercise video and music when an exercise support apparatus is used. Specifically, it is desirable to temporarily stop exercise video and music when an instructor in a fitness club makes an explanation to members who are taking his/her lesson using the exercise support apparatus. In this case, the instructor desires to temporarily stop the exercise video in order to clearly display a posture in the exercise for the members.

However, in the conventional technique, when the music and the exercise video are temporarily stopped, a parameter of the MIDI data is changed to a parameter for stopping output of the music by the exercise support apparatus. Thereafter, when the music is output again after the temporal stop, the parameter of the MIDI data is set to an on state. Furthermore, as for the exercise video, after the temporal stop, the output of the exercise video can be restarted from an output position of the exercise video immediately before the temporal stop. Meanwhile, since a parameter of the MIDI data before the temporal stop and a parameter of the MIDI data after the temporal stop are different from each other, it is not necessarily the case that the same music is reproduced before and after the temporal stop.

SUMMARY OF THE DISCLOSURE

The present disclosure has been made in view of the above problem. One exemplary embodiment of the present disclosure is to provide an apparatus comprising a processor and a memory configured to store Musical Instrument Digital Interface (MIDI) data. The memory is configured to store computer-executable instructions therein that, when executed by the processor, cause the apparatus to output audio based on the MIDI data according to a first exercise tempo and first audio volume. The computer-executable instructions, when executed by the processor, cause the apparatus to output exercise video representing an exercise motion according to the first exercise tempo, wherein the exercise video is configured to be output to a display. The computer-executable instructions, when executed by the processor, cause the apparatus to determine whether a request for temporal stop of outputting the exercise movie is received, and, change to a second audio volume of MIDI data by decreasing the first audio volume by pre-determined value and to a second exercise tempo by decreasing the first exercise tempo by a pre-determined tempo value, in response to determining that a request for the temporal stop is received. The computer-executable instructions, when executed by the processor, cause the apparatus to output audio based on the MIDI data according to the second audio volume and the second exercise tempo, in response to the changing to the second audio volume and the second exercise tempo, and, temporal stop to output the exercise video, in response to determining that the request for temporal stop is received. The computer-executable instructions, when executed by the processor, cause the apparatus to determine whether a request for cancelling temporal stop of outputting the exercise video is received, and, change the second audio volume to the first audio volume, and the second exercise tempo to the first exercise tempo, in response to determining that the request for cancelling temporal stop is received. The computer-executable instructions, when executed by the processor, cause the apparatus to output audio based on the MIDI data according to the first audio volume and the first exercise tempo, in response to determining that the request for cancelling temporal stop is received, and, restart to output the exercise video representing the exercise motion based on the first exercise tempo.

Another exemplary embodiment of the disclosure is to provide a non-transitory computer-readable storage media storing computer-executable instructions, when executed, cause an apparatus to output audio based on Musical Instrument Digital Interface (MIDI) data according to a first exercise tempo and first audio volume. The MIDI data is configured to store in a memory and the memory is configured to be connected to the apparatus. The computer-executable instructions, when executed by the processor, cause the apparatus to output exercise video representing an exercise motion according to the first exercise tempo, wherein the exercise video is configured to be output to a display. The computer-executable instructions, when executed by the processor, cause the apparatus to determine whether a request for temporal stop of outputting the exercise video is received, and, change to a second audio volume of MIDI data by decreasing the first audio volume by pre-determined value and to a second exercise tempo by decreasing the first exercise tempo by a pre-determined tempo value, in response to determining that a request for the temporal stop is received. The computer-executable instructions, when executed by the processor, cause the apparatus to output audio based on the MIDI data according to the second audio volume and the second exercise tempo, in response to the changing the second audio volume and the second exercise tempo, and, temporal stop to output the exercise video, in response to determining that the request for temporal stop is received. The computer-executable instructions, when executed by the processor, cause the apparatus to determine whether a request for cancelling temporal stop of outputting the exercise video is received, and, change the second audio volume to the first audio volume, and, the second exercise tempo to the first exercise tempo, in response to determining that the request for cancelling temporal stop is received. The computer-executable instructions, when executed by the processor, cause the apparatus to output audio based on the MIDI data according to the first audio volume and the first exercise tempo, in response to determining that the request for cancelling temporal stop is received, and, restart to output the exercise video representing the exercise motion based on the first exercise tempo.

A further exemplary embodiment of the disclosure is to provide a method for outputting, by an apparatus, audio based on Musical Instrument Digital Interface (MIDI) data according to a first exercise tempo and first audio volume. The MIDI data is stored in a memory that is configured to be connected to the apparatus. The method comprises outputting, by an apparatus, exercise video representing an exercise motion according to the first exercise tempo, wherein the exercise video is configured to be output to a display, and determining, by an apparatus, whether a request for temporal stop of outputting the exercise video is received. The method comprises changing, by an apparatus, to a second audio volume of MIDI data by decreasing the first audio volume by a pre-determined value and to a second exercise tempo by decreasing the first exercise tempo by a pre-determined tempo value, in response to determining that a request for the temporal stop is received. The method comprises outputting, by an apparatus, audio based on the MIDI data according to the second audio volume and the second exercise tempo, in response to the changing the second audio volume and the second exercise tempo. The method comprises temporal stopping, by an apparatus, to output the exercise video, in response to determining that the request for temporal stop is received. The method comprises determining, by an apparatus, whether a request for cancelling temporal stop of outputting the exercise video is received, and, changing, by an apparatus, the second audio volume to the first audio volume, and the second exercise tempo to the first exercise tempo, in response to determining that the request for cancelling temporal stop is received. The method comprises outputting, by an apparatus, audio based on the MIDI data according to the first audio volume and the first exercise tempo, in response to determining that the request for cancelling temporal stop is received, and, restarting, by an apparatus, to output the exercise video representing the exercise motion based on the first exercise tempo.

Other objects, features, and advantages will be apparent to persons of ordinary skill in the art from the following detailed description of the disclosure and the accompanying drawings.

BRIEF DESCRIPTION OF THE DRAWINGS

For a more complete understanding of the present disclosure, reference now is made to the following descriptions taken in connection with the accompanying drawing.

FIG. 3 is a table illustrating a storage state of exercise lesson information stored in an exercise lesson information temporal storage area;

FIG. 6 is a table illustrating coordinate positions of body portions illustrated in FIG. 5B so that a certain motion of the video information is displayed;

FIG. 9 is a diagram schematically illustrating an operation of generating computer graphics of individual frames when normal reproduction is performed after a temporal stop.

DESCRIPTION OF EXEMPLARY EMBODIMENTS

Hereinafter, an exemplary embodiment of the present disclosure will be described. In this embodiment, a description will be made with reference to the accompanying drawings taking an exercise support apparatus 1 as an example.

Configuration of Appearance of Exercise Support Apparatus 1

Figure 1:
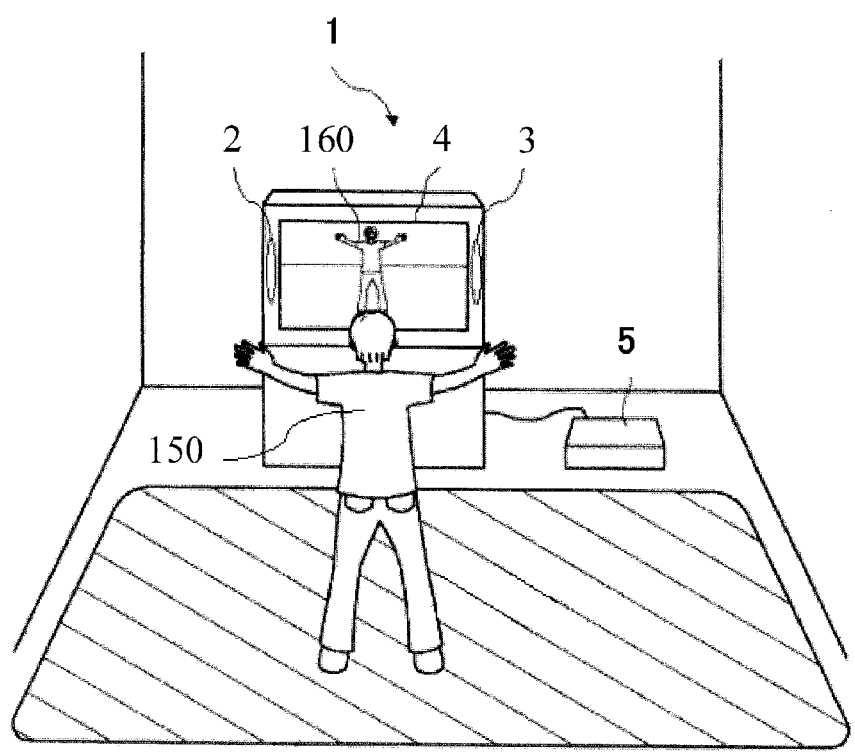
FIG. 1 is a diagram schematically illustrating an exercise support apparatus.

As illustrated in FIG. 1, the exercise support apparatus 1 includes speakers 2 and 3, a display 4, and an information input unit 5. The display 4 displays exercise video 160. When the exercise video 160 is displayed in the display 4, audio such as music is output from the speakers 2 and 3 along with the display of the exercise video 160. A user inputs information used to select an exercise and information used to select music using the information input unit 5. Examples of the information input unit 5 include a keyboard and a mouse. As shown in FIG. 1, a user 150 performs exercise while watching the exercise video 160 displayed in the display 4. The exercise support apparatus 1 provides exercise content constituted by the exercise video 160 and the audio such as music.

Electric Configuration of Exercise Support Apparatus 1

Figure 2:
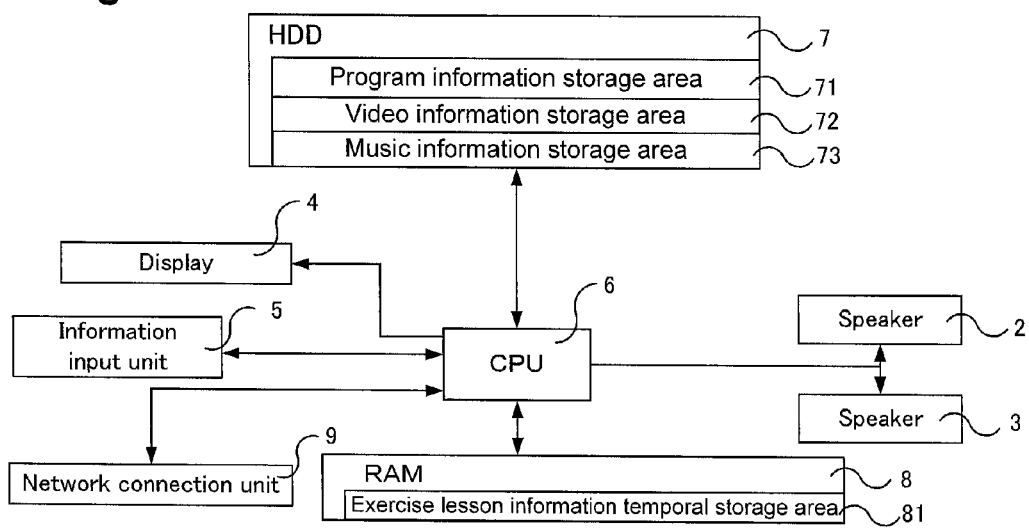
FIG. 2 is a diagram illustrating an electric configuration of the exercise support apparatus.

As shown in FIG. 2, the exercise support apparatus 1 of this embodiment includes a CPU 6 which controls the exercise support apparatus 1. To the CPU 6, the speakers 2 and 3, the display 4, the information input unit 5, an HDD 7, a RAM 8, and a network connection unit 9 are electrically connected. The CPU 6 serves as a computer which performs a process of controlling operation of the exercise support apparatus 1 with storage means including the HDD 7 and the RAM 8. The network connection unit 9 communicates with a server on a network through the Internet.

The HDD7 is an example of a non-transitory computer-readable medium. The HDD 7 includes a program information storage area 71, a video information storage area 72, and a music information storage area 73. The program information storage area 71 stores a main operation program used to control the exercise support apparatus 1. Note that the program may be downloaded from a server on the network, for example, or may be recorded in a recording medium such as a CD-ROM and read from the recording medium, for example.

The video information storage area 72 stores video information. In this embodiment, as the video information, three-dimensional computer graphic (hereinafter referred to as "3DCG") images are stored in the video information storage area 72. Specifically, video information corresponding to various exercise motions is stored in the video information storage area 72. Note that the video information of this embodiment will be described in detail hereinafter with reference to FIGS. 4 to 6.

The music information storage area 73 stores music information. The music information is used to output music from the speakers 2 and 3. In this embodiment, MIDI data is stored in the music information storage area 73, for example. Specifically, a title of music, an artist name, and music identifying information which are used to identify the music information are stored in the music information storage area 73 while being associated with the music information.

The RAM 8 includes an exercise lesson information temporal storage area 81. The exercise lesson information temporal storage area 81 temporarily stores exercise lesson information. As shown in FIG. 3, the exercise lesson information includes motion information, an exercise tempo, a repetition number, and music information. The motion information is used to identify an exercise motion. In the exercise support apparatus 1 of this embodiment, "march", "knee-up", "side-step", and the like shown in FIG. 3 are executable as exercise motions. Therefore, the exercise support apparatus 1 can set the motion information which identifies "march", "knee-up", "side-step", and the like. In this embodiment, first, the motion information is selected. Next, the exercise tempo and the repetition number are determined. The exercise tempo represents a speed of performance of an exercise motion corresponding to the selected motion information. The exercise tempo is represented by BPM (Beat Per Minutes: BPM), for example. Video information is output in accordance with a value of a set exercise tempo. For example, when a value of BPM larger than a predetermined reference value is set, video information corresponding to an exercise motion a speed of which is higher than a standard exercise tempo is output. For example, when a value of BPM smaller than the predetermined reference value is set, video information corresponding to an exercise motion a speed of which is lower than the standard exercise tempo is output. An exercise tempo is set for selected motion information as shown in FIG. 3.

The repetition number represents the number of times an exercise motion is repeated. The repetition number is set to selected motion information as shown in FIG. 3. Lastly, desired music is selected from the music information stored in the music information storage area 73. The user assigns desired music information to motion information included in exercise lesson information. The assigned music information is associated with the motion information included in the exercise lesson information and temporarily stored in the exercise lesson information temporal storage area 81. FIG. 3 is an example of a case where the same music information is assigned to a plurality of motion information. For example, in FIG. 3, music information "TT" is assigned to the motion information "march" and the motion information "knee-up". Music information may be assigned to motion information as a one-to-one relationship.

Video information and music information are output in accordance with the exercise lesson information generated by the process described above. Specifically, motions corresponding to the motion information "march", "knee-up", "side-step", "chest press", "back lunge", "knee-up", and "march" shown in FIG. 3 are performed in this order. First, video information corresponding to the motion information "march" is output to the display 4. Simultaneously with the output of the video information corresponding to the motion information "march" to the display 4, the music information "TT" corresponding to the motion information "march" is output. In this case, the video information and the music information are output at an exercise tempo of "120" BPM corresponding to the motion information "march". Furthermore, the video information corresponding to the motion information "march" is repeatedly output "4" times which is a repetition number corresponding to the motion information "march". Thereafter, video information and music information corresponding to the motion information "knee-up", "side-step", "chest press", "back lunge", "knee-up", and "march" are output in this order. As described above, exercise content which is obtained by combining video information and music information is output from the exercise support apparatus 1. Note that a method for outputting video information and music information has been disclosed in detail in Japanese Unexamined Patent Application Publication No. 2010-107817, and therefore, a detailed description thereof is omitted.

Generation of 3DCGs of Frames

Figure 4:
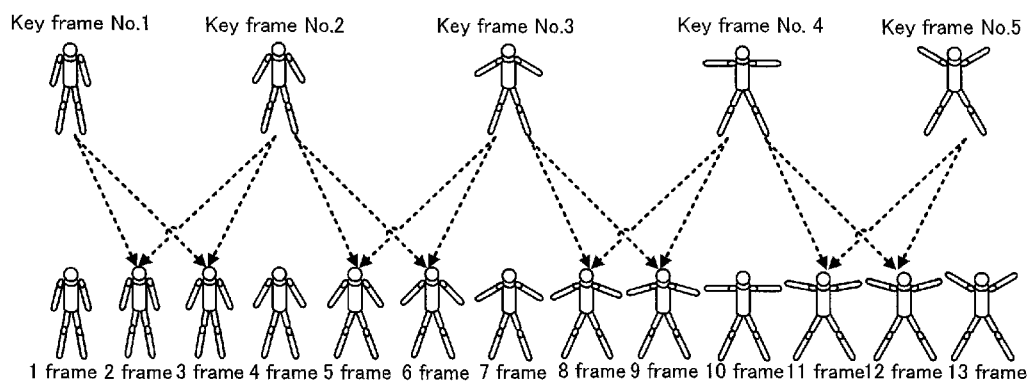
FIG. 4 is a diagram schematically illustrating an operation of generating computer graphics of individual frames in accordance with key frame images and a standard exercise tempo.

Hereinafter, a method for generating 3DCGs of individual frames according to this embodiment will be described with reference to FIGS. 4 to 6. As shown in FIG. 4, in this embodiment, key frame images and a standard exercise tempo are stored as video information in the video information storage area 72 for each motion.

The key frame images represent main or representative 3DCG images of exercise motions representing various motions. Furthermore, the standard exercise tempo represents a tempo of a reference for an output of video information stored as the key frame images. Hereinafter, the key frame images and the standard exercise tempo will be described with reference to FIG. 4. A case where 3DCG images corresponding to key frame images of "key frame number 1", "key frame number 2", "key frame number 3", "key frame number 4", and "key frame number 5" are stored as video information as shown in FIG. 4 will be described as an example. Note that the example shown in FIG. 4 is merely an example.

As shown in FIG. 4, key frame images are generated with a predetermined 3DCG motion interval and are stored in the video information storage area 72. Then 3DCGs are generated at a frame rate of the display 4 in accordance with the key frame images. In the example shown in FIG. 4, 3DCGs corresponding to "second frame" and "third frame" are generated in accordance with the key frame images of "key frame number 1" and "key frame number 2". Note that a 3DCG corresponding to "first frame" is the same as that corresponding to "key frame number 1" in this example. Furthermore, note that, a 3DCG corresponding to "fourth frame" is the same as that corresponding to "key frame number 2" in this example.

Specifically, coordinate positions of the 3DCGs corresponding to "second frame" and "third frame" are determined in accordance with coordinate positions of the key frame images of "key frame number 1" and "key frame number 2". A 3DCG image process is performed in accordance with the determined coordinate positions and the 3DCGs are displayed in the display 4. Hereinafter, coordinate positions and 3DCGs of this embodiment will be described in detail with reference to FIGS. 5A, 5B, and 6.

Figure 5A:
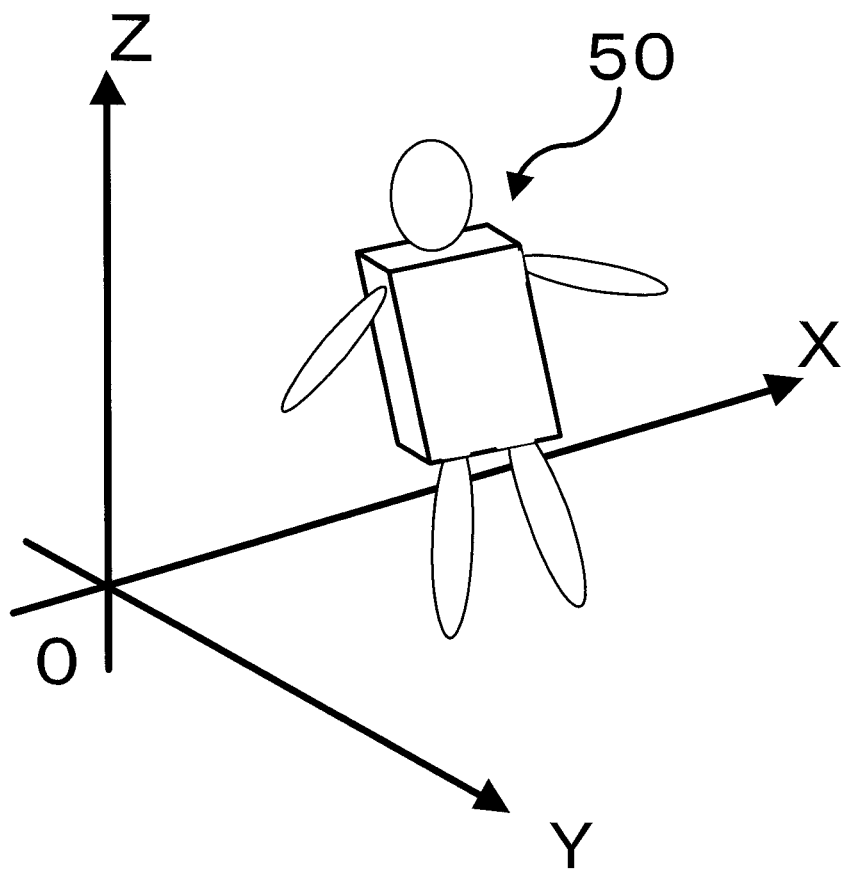
FIGS. 5A and 5B are concept diagrams illustrating display states of video information in a display.
Figure 5B:
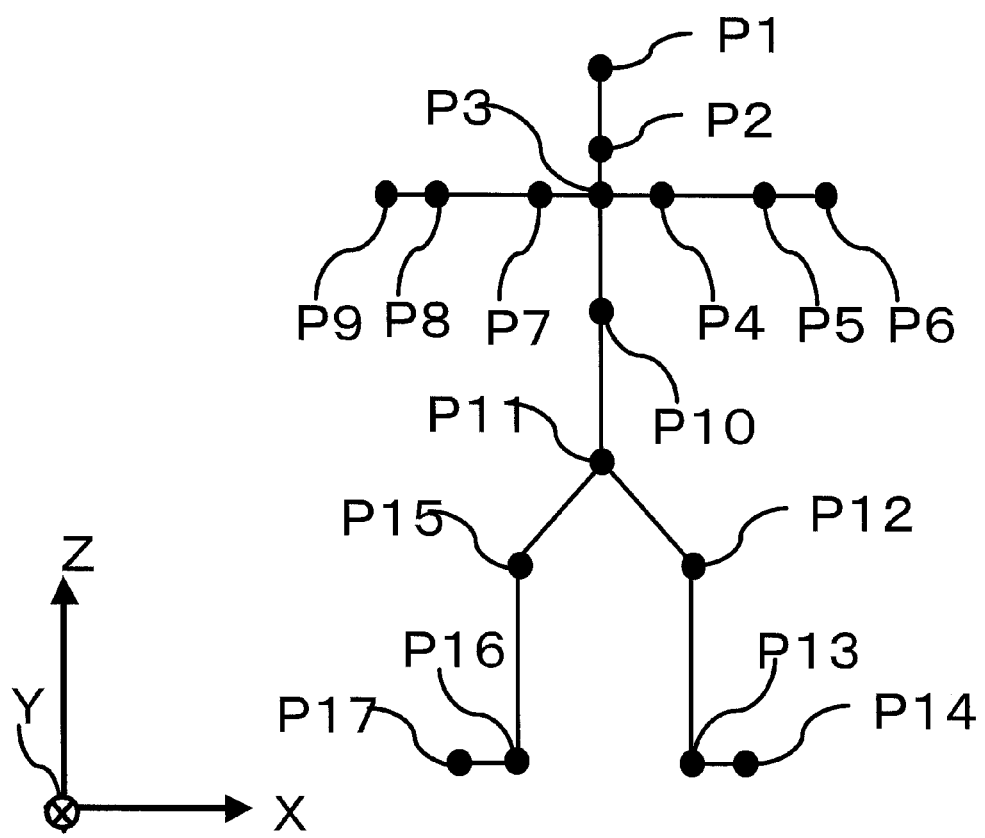

FIG. 5A is a concept diagram illustrating video information 50 representing a human figure by CG which is displayed in the display 4 while X, Y, and Z axes are defined in a display screen of the display 4. Furthermore, FIG. 5B is a concept diagram illustrating coordinate positions of body portions of a person represented by the video information 50 shown in FIG. 5A. The video information 50 shown in FIG. 5A is generated in accordance with the coordinate positions of the body portions shown in FIG. 5B. In FIG. 5B, P1 to P17 denote the body portions of the person. An image corresponding to coordinate positions in X, Y, and Z axes of the body portions P1 to P17 shown in FIG. 6 is displayed in the display 4. By consecutively displaying the image corresponding to the coordinate positions shown in FIG. 6 and succeeding images in the display 4 for individual frames, video of the person who performs a certain exercise is displayed in the display 4.

In this embodiment, coordinate positions of the 3DCGs corresponding to "second frame" and "third frame" are determined in accordance with the key frame images of "key frame number 1" and "key frame number 2" using the coordinate positions illustrated in FIGS. 5A, 5B, and 6. Specifically, the 3DCG of "second frame" is an image obtained by blending a certain amount of the key frame image of "key frame number 1" and a certain amount of the key frame image of "key frame number 2" with each other. The term "blend" represents that some of coordinate positions of "key frame number 1" and some of coordinate portions of "key frame number 2" are combined with each other so that an image is generated. The coordinate positions of the 3DCG of "second frame" are determined by the following equation, for example.

$$[(\text{coordinate positions of "second frame"}) = \alpha(0 < \alpha < 1) * \\ (\text{coordinate positions of "key frame number 1"}) + \\ (1-\alpha)*(\text{coordinate positions of "key frame number 2"})]$$

Furthermore, the coordinate positions of the 3DCG of "third frame" are determined by the following equation, for example.

$$[(\text{coordinate positions of "third frame"}) = \beta(0 < \beta < 1) * \\ (\text{coordinate positions of "key frame number 1"}) + \\ (1-\beta)*(\text{coordinate positions of "key frame number 2"}), \text{ note that } \alpha > \beta]$$

As described above, in the 3DCG of "second frame", an amount of content of "key frame number 1" to be blended is larger than that of "key frame number 2". On the other hand, in the 3DCG of "third frame", an amount of content of "key frame number 2" to be blended is larger than that of "key frame number 1". By this, the 3DCGs are smoothly generated for individual frames in accordance with the key frame images.

Similarly, coordinate positions of 3DCGs corresponding to "fifth frame" and "sixth frame" are determined in accordance with coordinate positions of the key frame images of "key frame number 2" and "key frame number 3". A 3DCG image process is performed in accordance with the determined coordinate positions and the 3DCGs are displayed in the display 4. Note that a 3DCG corresponding to "fourth frame" is the same as that corresponding to "key frame number 2" in this example. Furthermore, note that, a 3DCG corresponding to "seventh frame" is the same as that corresponding to "key frame number 3" in this example.

By performing the process described above, 3DCGs are generated for individual frames and displayed in the display 4. In this embodiment, a frame rate for the display of the 3DCGs in the display 4 is 30 fps (Frames per Second). In FIG. 4 of this embodiment, a case where a key frame image is set for three frame rates is taken as an example. As shown in FIG. 4, a 3DCG is generated for each frame having the frame rate of 30 fps in accordance with the key frame images. In FIG. 4, 3DCGs generated for individual frames (first to thirteenth frame shown in FIG. 4) having the frame rate of 30 fps are output to the display 4. In this case, in this embodiment, the 3DCG images output to the display 4 for individual frames in accordance with the frame rate of 30 fps correspond to exercise motions performed in accordance with the set standard exercise tempo. As described above, the 3DCGs of individual frames are generated in accordance with the standard exercise tempo.

As described above, according to this embodiment, the key frame images are set in accordance with the standard exercise tempo as shown in FIG. 4. In this way, since the 3DCGs are generated for individual frames in accordance with the key frame images, images corresponding to exercise motions to be performed can be output in accordance with the standard exercise tempo.

Figure 7A:
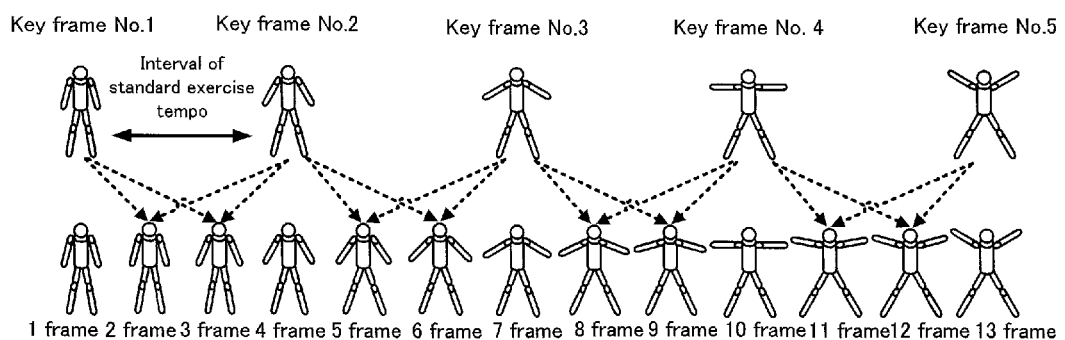
FIGS. 7A and 7B are diagrams schematically illustrating an operation of generating computer graphics of individual frames in accordance with key frame images, a standard exercise tempo, and a set exercise tempo in a case where the exercise tempo is lower than the standard exercise tempo.
Figure 7B:
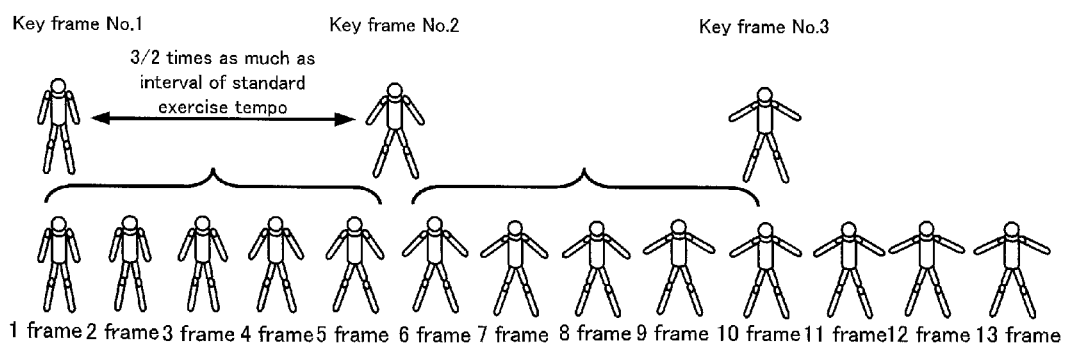

Hereinafter, an operation of generating the 3DCGs of frames in accordance with the key frame images, the standard exercise tempo, and a set exercise tempo in a case where the exercise tempo is lower than the standard exercise tempo will be schematically described with reference to FIGS. 7A and 7B. FIG. 7A is an example of a diagram similar to the diagram of FIG. 4. FIG. 7B is an example of a concept diagram illustrating generation of CGs of frames in accordance with the standard exercise tempo and a set exercise tempo. In particular, a case where video information is output at an exercise tempo corresponding to ⅔ of the standard exercise tempo of FIG. 7A is illustrated in FIG. 7B. When the standard exercise tempo is 90 BPM, for example, the exercise tempo is 60 BPM. Specifically, a case where 3DCGs are generated at the standard exercise tempo is illustrated in FIG. 7A whereas a case where 3DCGs are generated at the exercise tempo corresponding to ⅔ of the standard exercise tempo is illustrated in FIG. 7B. The 3DCGs illustrated in FIG. 7B are generated at the exercise tempo set in the exercise lesson information.

When the set exercise tempo is lower than the standard exercise tempo, an output interval between "key frame number 1" and "key frame number 2" at the exercise tempo shown in FIG. 7B is larger than an output interval between "key frame number 1" and "key frame number 2" at the standard exercise tempo shown in FIG. 7A. This is because, when a tempo is lowered, an output speed of music is lowered and an output speed of video is lowered. Therefore, since the exercise tempo is lower than the standard exercise tempo, an output interval between key frame images becomes larger than that of the standard exercise tempo. On the other hand, when the exercise tempo is higher than the standard exercise tempo, an output interval between key frame images becomes small.

When the exercise tempo is lower than the standard exercise tempo, the output interval between key frame images is large, and accordingly, the number of frames to be output between key frame images is increased when compared with the number of frames output at the standard exercise tempo. In the examples of FIGS. 7A and 7B, 3DCGs of the second and third frames are generated between "key frame number 1" and "key frame number 2" in FIG. 7A, whereas, 3DCGs of the second to fifth frames are generated between "key frame number 1" and "key frame number 2" in FIG. 7B. Consequently, the 3DCGs of the second and third frames are generated from the coordinate positions of "key frame number 1" and the coordinate positions of "key frame number 2" in FIG. 7A, whereas, the 3DCGs of the second to fifth frames are generated from the coordinate positions of "key frame number 1" and the coordinate positions of "key frame number 2" in FIG. 7B. As described above, even when the exercise tempo is lower than the standard exercise tempo, the 3DCGs of the frames are generated in accordance with the key frame images. As a result, images representing various exercise motions can be smoothly displayed in the display 4.

Figure 8A:
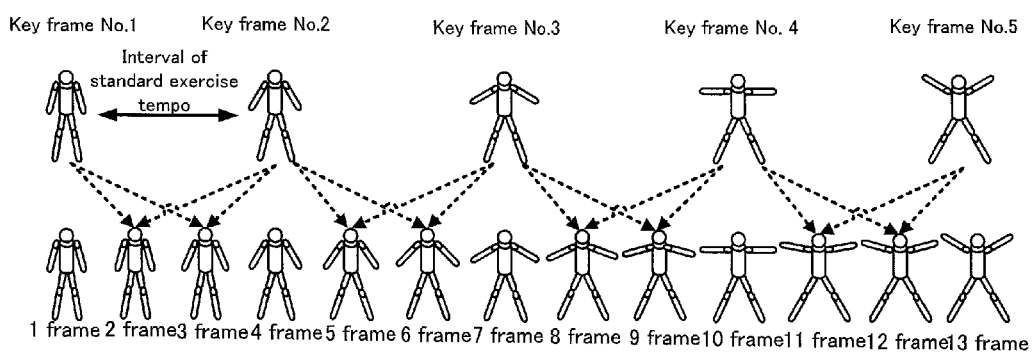
FIGS. 8A and 8B are diagrams schematically illustrating an operation of generating computer graphics of individual frames in accordance with the key frame images, the standard exercise tempo, and a set exercise tempo in a case where the exercise tempo is higher than the standard exercise tempo.
Figure 8B:
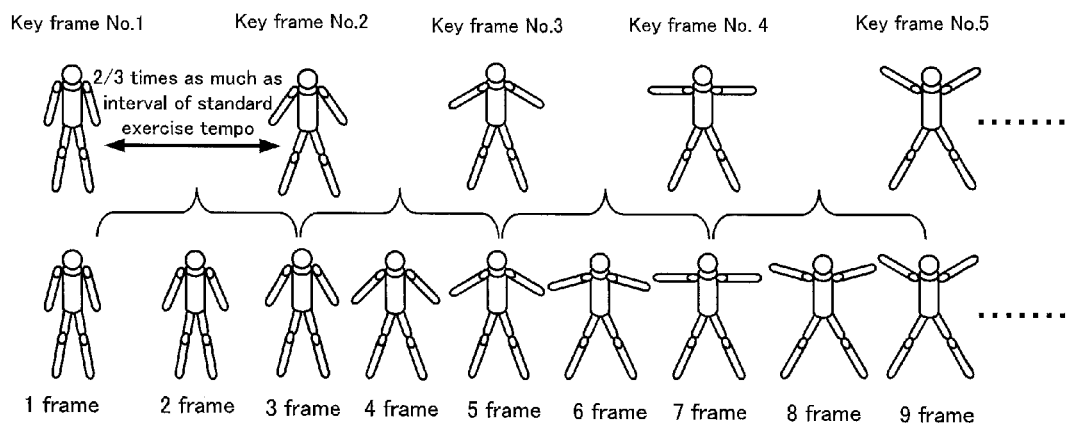

On the other hand, a case where the exercise tempo is higher than the standard exercise tempo will be described with reference to FIGS. 8A and 8B. FIG. 8A is a diagram similar to the diagram of FIG. 4. FIG. 8B is a concept diagram illustrating generation of CGs of frames in accordance with the standard exercise tempo and a set exercise tempo. In particular, an example in which video information is output at an exercise tempo of 3/2 of the standard exercise tempo of FIG. 8A is illustrated in FIG. 8B. When the standard exercise tempo is 90 BPM, for example, the exercise tempo is 135 BPM. Specifically, a case where 3DCGs are generated at the standard exercise tempo is illustrated in FIG. 8A whereas the case where 3DCGs are generated at the exercise tempo corresponding to 3/2 of the standard exercise tempo is illustrated in FIG. 8B. The 3DCGs illustrated in FIG. 8B are generated at the exercise tempo set in the exercise lesson information.

When the set exercise tempo is higher than the standard exercise tempo, an output interval between "key frame number 1" and "key frame number 2" at the exercise tempo shown in FIG. 8B is smaller than an output interval between "key frame number 1" and "key frame number 2" at the standard exercise tempo shown in FIG. 8A. This is because, when a tempo is higher, an output speed of music is higher and an output speed of video is higher. Therefore, since the exercise tempo is higher than the standard exercise tempo, an output interval between key frame images becomes smaller than that of the standard exercise tempo.

When the exercise tempo is higher than the standard exercise tempo, the output interval between key frame images is small, and accordingly, the number of frames to be output between key frame images is decreased when compared with the number of frames output at the standard exercise tempo. In the examples of FIGS. 8A and 8B, 3DCGs of the second and third frames are generated between "key frame number 1" and "key frame number 2" in FIG. 8A, whereas, only a 3DCG of the second frame is generated between "key frame number 1" and "key frame number 2" in FIG. 8B. Consequently, the 3DCGs of the second and third frames are generated from the coordinate positions of "key frame number 1" and the coordinate positions of "key frame number 2" in FIG. 8A, whereas, only the 3DCG of the second frame is generated from the coordinate positions of "key frame number 1" and the coordinate positions of "key frame number 2" in FIG. 8B. As described above, even when the exercise tempo is higher than the standard exercise tempo, the 3DCGs of the frames are generated in accordance with the key frame images.

Temporal Stop Process

Hereinafter, a temporal stop process of this embodiment will be described with reference to FIG. 9. In this embodiment, exercise content is provided by simultaneously outputting video information and music information. In this embodiment, MIDI data is output by software. Specifically, a software synthesizer capable of outputting MIDI data by software is stored in a predetermined storage area included in the HDD 7. The CPU 6 generates predetermined sound by the software synthesizer in accordance with the MIDI data. Then the CPU 6 outputs the generated sound from the speakers 2 and 3. The CPU 6 generates an instruction for outputting sound to the speakers 2 and 3 so that the speakers 2 and 3 output the generated sound. Note that a dedicated sound source board capable of outputting sound in accordance with MIDI data may be included in the exercise support apparatus 1 instead of the software synthesizer.

In this embodiment, the CPU 6 outputs the MIDI data at a set exercise tempo. Specifically, the CPU 6 generates a clock so that the MIDI data is output at the set exercise tempo. When the generated clock is transmitted to software synthesizer, sound generated on the basis of the MIDI data is output in accordance with the clock. Then the generated sound is output from the speakers 2 and 3.

When simultaneously outputting the MIDI data and the video information as exercise content, the exercise support apparatus 1 performs a temporal stop process. The temporal stop process is performed when the user 150 temporarily stops output of the video information and the music information. In this case, the CPU 6 changes a parameter of the MIDI data to a parameter for stopping output of the MIDI data. Then, when the music is output again after the temporal stop, the parameter of the MIDI data is set to an on state. Furthermore, as for the video information, when output of the video information is restarted after the temporal stop, the output of the video information can be restarted from an output position of the video information obtained before the temporal stop. However, since the parameter of the MIDI data before the temporal stop and the parameter of the MIDI data after the temporal stop are different from each other, it is not necessarily the case that the same music is reproduced before and after the temporal stop. Therefore, in this embodiment, when the temporal stop process is requested by the exercise support apparatus 1, the output of the video information is temporarily stopped and the MIDI data is output by super slow reproduction which is slower than normal slow reproduction while a volume is decreased.

As shown in FIG. 9, it is assumed that 3DCGs of M-th frame to (M+156)-th frame which are surrounded by a frame of a dashed-dotted line 60 are generated in accordance with key frame images, a standard exercise tempo, and a set exercise tempo by the method shown in FIGS. 7A and 7B or the method shown in FIGS. 8A and 8B. In this embodiment, 3DCGs of the (M+156)-th frame onwards may be also generated. In this case, when a temporal stop is not performed, the 3DCGs of the M-th frame to the (M+156)-th frame are displayed in the display 4 at the frame rate. On the assumption of this, it is assumed that the exercise support apparatus 1 generates a temporal stop request at the (M+4)-th frame. Specifically, the exercise support apparatus 1 performs normal display from the M-th frame to the (M+4)-th frame but the exercise support apparatus 1 performs the temporal stop process from the (M+5)-th frame onwards, that is, the 3DCGs of the (M+5)-th frame onwards are not displayed in the display 4. In FIG. 9 of this embodiment, the temporal stop corresponds to 5 seconds, for example.

When the exercise support apparatus 1 receives the request for performing the temporal stop process, super slow reproduction having a reproduction speed which is lower than that of normal slow reproduction is set. In this embodiment, 1 BPM is set for the super slow reproduction. Specifically, the lowest speed in output of MIDI data may be set. The minimum tempo in output of MIDI data may be set, and the minimum tempo is configured to be set as a minimum value of the tempo for the exercise support apparatus. Instead of 1 BPM, one of the tempo values within a range from the minimum tempo to a predetermined tempo may be set. Alternatively, arbitrary value of BPM within a predetermined range from the lowest speed of MIDI data may be set. Furthermore, alternatively, a value reducing an exercise tempo obtained before the temporal stop by a predetermined value of BPM may be used as a super slow reproduction speed of the MIDI data at the time of the temporal stop.

Furthermore, an output volume of the MIDI data is set to zero. Specifically, the smallest volume of output of the MIDI data is set. Alternatively, arbitrary value of BPM within a predetermined range from the smallest volume of the MIDI data may be set. Furthermore, alternatively, a value smaller than a volume obtained before the temporal stop by a predetermined value may be used as a volume of the MIDI data at the time of the temporal stop. In this embodiment, as for the MIDI data, the volume is set to zero and the output speed is set to 1 BPM, and the MIDI data is output from the speakers 2 and 3. On the other hand, output of the video information is totally stopped.

It is assumed that the exercise support apparatus 1 receives a request for cancelling of the temporal stop after 5 seconds have passed since from receiving since the request for performing the temporal stop process was received. Note that the elapsed time after receiving the request for performing the temporal stop process is measured by a counting function of the CPU 6. In this case, the setting of BPM of the MIDI data is changed in response to the request for cancelling the temporal stop. Specifically, the value of BPM is reset so as to correspond to the exercise tempo obtained before the temporal stop. Furthermore, the volume of the MIDI data is reset to the volume obtained before the temporal stop. Moreover, in this embodiment, video information to be output at the restart is determined in response to the request for cancelling the temporal stop. Hereinafter, a method for determining video information to be output at the restart will be described.

In the example of FIG. 9, the exercise support apparatus 1 receives a request for cancelling of the temporal stop after 5 seconds have passed since the request for performing the temporal stop process was received. In this case, output of the 3DCGs for 150 frames has been stopped. The value 150 is obtained since the number of frames output in 5 seconds is calculated as follows taking the frame rate of 30 fps of the display 4 of this embodiment into consideration: 30 fps*5 seconds=150 frames.

Next, the 3DCGs of the individual frames to be output at 1 BPM after the (M+4)-th frame are determined, Specifically, as with the case of FIGS. 7A and 7B, the 3DCGs of the individual frames are generated at the exercise tempo of 1 BPM for the super slow reproduction in accordance with the standard exercise tempo and the key frame images. Then, as shown in FIG. 9, it is determined that the 3DCGs from the (M+4)-th frame to the (M+155)-th frame which are surrounded by a frame of a dashed-two-dotted line 70 are generated in accordance with the key frame images, the standard exercise tempo, and the exercise tempo of 1 BPM. It is assumed that as shown FIG. 7(A), the standard exercise tempo is 90 BPM and after executing the temporal stop process is executed, the exercise tempo is set to 1 BPM. In this case, an interval of 1 BPM for the super slow reproduction between key frame No. 1 and No. 2 is $90^{th}$ times as much as the interval of the standard exercise tempo. Based on the key frame images such as the key frame No. 1 and key frame No. 2, the 3DCGs for individual frames in the interval of the 1 BPM are generated. As explained above, the (M+4)-th frame to the (M+155)-th frame are generated based on the standard exercise tempo, 1 BPM for the super slow reproduction and the key frame images. In this embodiment, 3DCGs of the (M+155)-th frame onwards are also generated. A 3DCG of a frame obtained by adding 150 frames to the (M+4)-th frame is determined from among the 3DCGs of the (M+4)-th frame to the (M+155)-th frame generated as described above which are surrounded by the dashed-two-dotted line 70. In the example of FIG. 9, a 3DCG of the (M+154)-th frame which is surrounded by a dashed line 80 and which is obtained by adding 150 frames to the (M+4)-th frame included in the dashed-two dotted line 70 is determined.

Then, in response to the cancel of the temporal stop, the CPU 6 starts output again from the 3DCG of the (M+154)-th frame surrounded by the dashed line 80. After the (M+154)-th frame surrounded by the dashed line 80 is determined, generation of 3DCGs of the individual frames is started again at the exercise tempo obtained before the temporal stop using the method illustrated in FIGS. 7A and 7B or the method illustrated in FIGS. 8A and 8B from the (M+154)-th frame surrounded by the dashed line 80 serving as a reference. The generated 3DCGs are output to the display 4. Furthermore, the volume is reset to the volume obtained before the temporal stop, and the output of the MIDI data is restarted at the exercise tempo set before the temporal stop.

As described above, according to this embodiment, the CPU 6 measures a period of time of the temporal stop (for example, 5 sec in FIG. 9). Then the number of frames to be output to the display 4 within the period of time (for example, 150 frames in FIG. 9) is determined. Next, the 3DCGs of the individual frames output within the period of time of the temporal stop at 1 BPM are determined in accordance with a result of the measurement. Then a 3DCG of a frame obtained by adding the determined number of frames to a position of the temporal stop is determined. The output of the video information is restarted after the temporal stop from a coordinate position of the determined 3DCG. As a result, even when the output of the video information is temporarily stopped and the MIDI data is output at super slow reproduction (for example, 1 BPM), video and music before and after the temporal stop can be smoothly output.

Main Processing of Exercise Support Apparatus 1

Figure 10A:
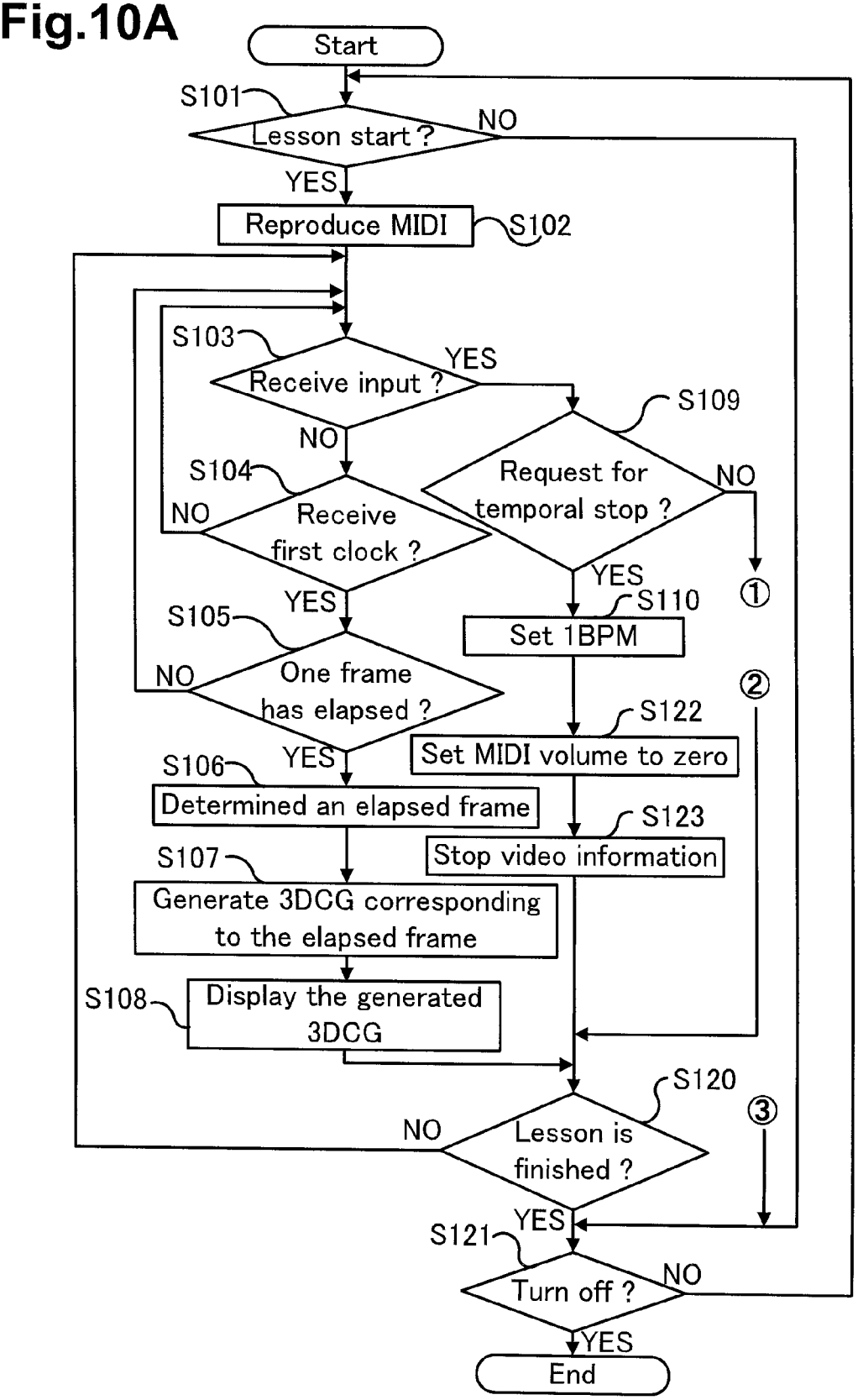
FIGS. 10A and 10B are a flowchart illustrating a main operation of an embodiment.
Figure 10B:
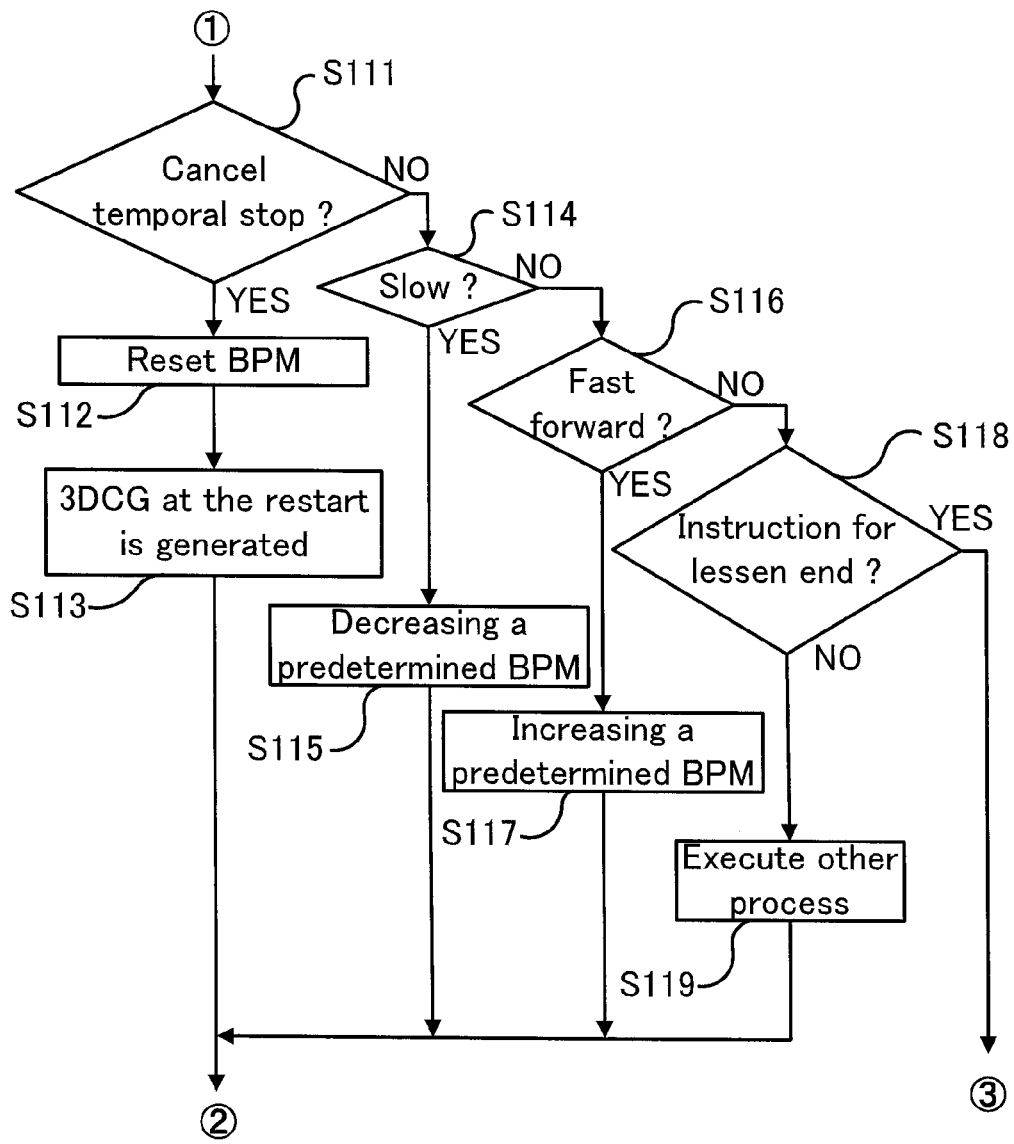

Processing and operation of the exercise support apparatus 1 of this embodiment configured as described above will be described with reference to the accompanying drawing. A main operation illustrated in FIG. 10A and FIG. 10B is executed when the CPU 6 executes a main operation program after the exercise support apparatus 1 and an external power source such as a commercial power source are connected to each other through a power source or a plug. The following processing is executed by the CPU 6.

In step S101, it is determined whether a lesson start instruction has been input. Specifically, it is determined whether start of a lesson has been instructed by the information input unit 5. When the determination is affirmative (step S101: YES), a process in step S102 is executed. When the determination is negative (step 101: NO), a process in step S121 is executed.

In step S102, MIDI data to be output is determined in accordance with exercise lesson information stored in the exercise lesson information temporal storage area 81. Thereafter, reproduction of the determined MIDI data is started at an exercise tempo. Specifically, output of the MIDI data is started.

In step S103, it is determined whether an external input has been performed by the information input unit 5. When the determination is affirmative (step S103: YES), a process in step S109 is executed. When the determination is negative (step S103: NO), a process in step S104 is executed.

In step S104, it is determined whether the software synthesizer has received a first clock used to output the MIDI data. When the determination is affirmative (step S104: YES), a process in step S105 is executed. When the determination is negative (step S104: NO), a process in step S103 is executed.

In step S105, it is determined whether a period of time corresponding to one frame has elapsed after an output of a preceding 3DCG. Specifically, it is determined whether a period of time corresponding to one frame ($\frac{1}{30}$ seconds) has elapsed after the output of the 3DCG of "third frame" illustrated in FIGS. 7A and 7B or FIGS. 8A and 8B, for example. When the determination is affirmative (step S105: YES), a process in step S106 is executed. When the determination is negative (step S105: NO), a process in step S103 is executed.

In step S106, an elapsed frame is determined. Specifically, when it is determined that the period of time corresponding to one frame (1/30 seconds) elapses after the output of the 3DCG of "third frame" illustrated in FIGS. 7A and 7B or FIGS. 8A and 8B in step S105, "fourth frame" is determined as the elapsed frame.

In step S107, a 3DCG corresponding to the elapsed frame is generated. Specifically, when "fourth frame" is determined as the elapsed frame in step S106, the 3DCG corresponding to "fourth frame" is generated in accordance with the key frame images as illustrated in FIGS. 7A and 7B or FIGS. 8A and 8B.

In step S108, the 3DCG generated in step S107 is displayed in the display 4.

In step S109, it is determined whether a request for temporal stop has been input by the information input unit 5. When the determination is affirmative (step S109: YES), a process in step S110 is executed. When the determination is negative (step S109: NO), a process in step S111 is executed.

In step S110, a speed of output of the MIDI data is set to 1 BPM. In step S122, an output volume of the MIDI data is set to zero. In step S123, output of the video information executed by the display 4 is stopped. Note that the process of setting the volume to zero and the process of stopping the output of the video information may be executed in different steps.

In step S111, it is determined whether a request for cancelling the temporal stop has been input by the information input unit 5. When the determination is affirmative (step S111: YES), a process in step S112 is executed. When the determination is negative (step S111: NO), a process in step S114 is executed.

In step S112, a value of BPM is reset to the value obtained before the temporal stop set in step S109 and step S110. Furthermore, in step S112, the volume is reset to the value obtained before the temporal stop set in step S109 and step S110. When the MIDI data is output at 100 BPM in step S102, for example, 1 BPM is changed to 100 BPM in step S112. The value of the volume is similarly changed.

In step S113, a 3DCG to be output at the restart after the temporal stop is cancelled is generated by the method illustrated in FIG. 9. A period of time of the temporal stop is determined. The determined period of time may be represented by seconds or by hours. The number of frames output in the period of time of the temporal stop is determined in accordance with the determined period of time. Then a 3DCG obtained after a period of time corresponding to the determined number of frames is determined by the method illustrated in FIG. 9. From the determined 3DCG, the output of images to the display 4 is restarted. Note that the method for generating a 3DCG has been described hereinabove with reference to FIG. 9, and therefore, a detailed description thereof is omitted. Then generated 3DCGs are displayed to the display 4.

In step S114, it is determined whether a request for normal slow reproduction has been input by the information input unit 5. When the determination is affirmative (step S114: YES), a process in step S115 is executed. When the determination is negative (step S114: NO), a process in step S116 is executed.

In step S115, a tempo which is lower than the exercise tempo set in step S102 by decreasing a predetermined value of BPM is set. In accordance with the set tempo, 3DCGs of frames are generated as illustrated in FIGS. 7A and 7B and output to the display 4. Furthermore, in accordance with the set tempo, the MIDI data is output from the speakers 2 and 3.

In step S116, it is determined whether a request for fast-forward reproduction has been input by the information input unit 5. When the determination is affirmative (step S116: YES), a process in step S117 is executed. When the determination is negative (step S116: NO), a process in step S118 is executed.

In step S117, a tempo which is higher than the exercise tempo set in step S102 by increasing a predetermined value of BPM is set. In accordance with the set tempo, 3DCGs of frames are generated as illustrated in FIGS. 8A and 8B and output to the display 4. Furthermore, in accordance with the set tempo, the MIDI data is output from the speakers 2 and 3.

In step S118, it is determined whether a lesson end instruction has been input by the information input unit 5. When the determination is affirmative (step S118: YES), a process in step S121 is executed. When the determination is negative (step 118: NO), a process in step S119 is executed.

In step S119, other process is executed in accordance with an input from the information input unit 5.

In step S120, it is determined whether output of entire exercise content included in the exercise lesson information stored in the exercise lesson information temporal storage area 81 has been finished. When the determination is affirmative (step S120: YES), output of the video information and MIDI data is stopped and a process in step S121 is executed. When the determination is negative (step S120: NO), the process in step S103 is executed.

In step S121, it is determined whether the exercise support apparatus 1 has been turned off. When the determination is affirmative (step S121: YES), the main operation processing is finished. When the determination is negative (step S121: NO), the process in step S101 is executed.

In this embodiment, the case where 3DCGs are used as exercise images has been described as an example. However, the present disclosure is not limited to this. For example, 2D images may be used instead of the 3DCGs. In this case, the coordinate positions shown in FIGS. 5A and 5B and FIG. 6 are included in an X-Y coordinate system.

Furthermore, in this embodiment, the exercise support apparatus 1 includes the speakers 2 and 3 and the display 4 as shown in FIG. 1. However, the present disclosure is not limited to this embodiment. For example, a computer connectable to a speaker and a display may be used as an exercise support apparatus. In this case, the various processes of this embodiment are performed by a main operation program stored in the HDD 7 of the exercise support apparatus. Furthermore, the main operation program of this embodiment may be installed in an electronic apparatus such as a general computer, a tablet PC, or a smart phone and the electronic apparatus may be used as the exercise support apparatus 1. In this case also, the electronic apparatus such as a computer, tablet PC, or a smart phone performs the various processes of this embodiment in accordance with the installed main operation program.

What is claimed is:

1. An apparatus comprising:
a processor; and
a memory configured to store Musical Instrument Digital Interface (MIDI) data and computer-executable instructions therein that, when executed by the processor, cause the apparatus to:
output audio based on the MIDI data according to a first exercise tempo and first audio volume;
output exercise video representing an exercise motion according to the first exercise tempo, wherein the exercise video is configured to be output to a display;
determine whether a request for a temporal stop of outputting the exercise video is received;

change to a second audio volume of MIDI data by decreasing the first audio volume by a pre-determined value and to a second exercise tempo by decreasing the first exercise tempo by a pre-determined tempo value, in response to determining that a request for the temporal stop is received;

output audio based on the MIDI data according to the second audio volume and the second exercise tempo, in response to changing to the second audio volume and the second exercise tempo;

perform a temporal stop process by temporarily stopping to output the exercise video, in response to determining that the request for the temporal stop is received;

determine whether a request for cancelling the temporal stop of outputting the exercise video is received;

change the second audio volume to the first audio volume, and the second exercise tempo to the first exercise tempo, in response to determining that the request for cancelling the temporal stop is received;

output audio based on the MIDI data according to the first audio volume and the first exercise tempo, in response to determining that the request for cancelling the temporal stop is received, and restart to output the exercise video representing the exercise motion based on the first exercise tempo.

2. The apparatus according to claim 1, wherein the memory is configured to store key frame images and standard exercise tempo associated with each other, wherein the key frame images represents representative images of the exercise motion;

wherein the computer-executable instruction causing the apparatus to restart to output the exercise video, further causes the communication device to:

determine the first number of the frames which was displayed by the display during a period from a time of receiving the request for the temporal stop to a time of receiving the request for cancelling the temporal stop, in response to determining that the request for cancelling the temporal stop is received;

generate images related to each of the frames which is configured to be displayed by the display, based on an image which was displayed by the display when receiving the request for the temporal stop, and the stored key frame images and the standard exercise tempo and the second exercise tempo;

identify, among the generated image, an image corresponding to a frame which is configured to be displayed by the display after the determined number of frames has elapsed from the image which was displayed by the display when receiving the request for the temporal stop, and restart to output the generated images from the identified image as the exercise video, according to the first exercise tempo.

3. The apparatus according to claim 2, wherein the memory is configured to store additional computer-executable instructions that, when executed by the processor, cause the apparatus to:

determine whether a request for slow reproduction is received;

change to a third exercise tempo by decreasing the first exercise tempo by a pre-determined tempo value, in response to determining that the request for slow reproduction is received, wherein the predetermined tempo value for the slow reproduction is configured to be requested when receiving the request for slow reproduction;

generate images related to each of the frames which is configured to be displayed by the display, based on the stored key frame images and the standard exercise tempo and the third exercise tempo, wherein the generated images are configured to be displayed in the display;

output the generated images as the exercise video according to a frame rate of the display, and output audio based on the MIDI data according to the third exercise tempo, in response to determining that the request for slow reproduction is received.

4. The apparatus according to claim 1, wherein the changing of the second exercise tempo comprises changing the second exercise tempo within a range from the minimum tempo to a predetermined tempo, wherein the minimum tempo is configured to be set as the minimum value of the tempo in the apparatus.

5. The apparatus according to claim 4, wherein the changing of the second exercise tempo comprises changing the minimum tempo as the second exercise tempo, wherein the minimum tempo is configured to be set as a minimum value in the apparatus.

6. A computer-readable storage media storing computer-executable instructions that, when executed, cause an apparatus to:

output audio based on Musical Instrument Digital Interface (MIDI) data according to a first exercise tempo and first audio volume, wherein the MIDI data is configured to store in a memory and wherein the memory is configured to be connected to the apparatus;

output exercise video representing an exercise motion according to the first exercise tempo, wherein the exercise video is configured to be output to a display;

determine whether a request for a temporal stop of outputting the exercise video is received;

change to a second audio volume of MIDI data by decreasing the first audio volume by a pre-determined value and to a second exercise tempo by decreasing the first exercise tempo by a pre-determined tempo value, in response to determining that a request for the temporal stop is received;

output audio based on the MIDI data according to the second audio volume and the second exercise tempo, in response to changing the second audio volume and the second exercise tempo;

perform a temporal stop process by temporarily stopping to output the exercise video, in response to determining that the request for the temporal stop is received;

determine whether a request for cancelling the temporal stop of outputting the exercise video is received;

change the second audio volume to the first audio volume, and the second exercise tempo to the first exercise tempo, in response to determining that the request for cancelling the temporal stop is received;

output audio based on the MIDI data according to the first audio volume and the first exercise tempo, in response to determining that the request for cancelling the temporal stop is received, and restart to output the exercise video representing the exercise motion based on the first exercise tempo.

7. The computer-readable storage media according to claim 6, wherein the memory is configured to store key frame images and standard exercise tempo associated with each other, wherein the key frame images represents representative images of the exercise motion;

wherein the computer-executable instruction causing the apparatus to restart to output the exercise video, further causes the communication device to:

determine the first number of the frames which was displayed by the display during a period from a time of receiving the request for the temporal stop to a time of receiving the request for cancelling the temporal stop, in response to determining that the request for cancelling the temporal stop is received;

generate images related to each of the frames which is configured to be displayed by the display, based on an image which was displayed by the display when receiving the request for the temporal stop, and the stored key frame images and the standard exercise tempo and the second exercise tempo;

identify, among the generated image, an image corresponding to a frame which is configured to be displayed by the display after the determined number of frames has elapsed from the image which was displayed by the display when receiving the request for the temporal stop, and restart to output the generated images from the identified image as the exercise video, according to the first exercise tempo.

8. The computer-readable storage media according to claim 7, wherein the computer-executable instructions that, when executed by the processor, further cause the apparatus to:

determine whether a request for slow reproduction is received;

change to a third exercise tempo by decreasing the first exercise tempo by a pre-determined tempo value, in response to determining that the request for slow reproduction is received, wherein the predetermined tempo value for the slow reproduction is configured to be requested when receiving the request for slow reproduction;

generate images related to each of the frames which are configured to be displayed by the display, based on the stored key frame images and the standard exercise tempo and the third exercise tempo, wherein the generated images are configured to be displayed in the display;

output the generated images as the exercise video according to a frame rate of the display, and output audio based on the MIDI data according to the third exercise tempo, in response to determining that the request for slow reproduction is received.

9. The computer-readable storage media according to claim 6, wherein the changing of the second exercise tempo comprises changing the second exercise tempo within a range from the minimum tempo to a predetermined tempo, wherein the minimum tempo is configured to be set as the minimum value of the tempo in the apparatus.

10. The computer-readable storage media according to claim 9, wherein the changing of the second exercise tempo comprises changing the minimum tempo as the second exercise tempo, wherein the minimum tempo is configured to be set as a minimum value in the apparatus.

11. A method comprising:

outputting, by an apparatus, audio based on Musical Instrument Digital Interface (MIDI) data according to a first exercise tempo and first audio volume, wherein the MIDI data is configured to store in a memory and wherein the memory is configured to be connected to the apparatus;

outputting, by an apparatus, exercise video representing an exercise motion according to the first exercise tempo, wherein the exercise video is configured to be output to a display;

determining, by an apparatus, whether a request for a temporal stop of outputting the exercise video is received;

changing, by an apparatus, to a second audio volume of MIDI data by decreasing the first audio volume by a pre-determined value and to a second exercise tempo by decreasing the first exercise tempo by a pre-determined tempo value, in response to determining that a request for the temporal stop is received;

outputting, by an apparatus, audio based on the MIDI data according to the second audio volume and the second exercise tempo, in response to changing the second audio volume and the second exercise tempo;

performing a temporal stop process, by an apparatus, by temporality stopping to output the exercise video, in response to determining that the request for the temporal stop is received;

determining, by an apparatus, whether a request for cancelling the temporal stop of outputting the exercise video is received;

changing, by an apparatus, the second audio volume to the first audio volume, and the second exercise tempo to the first exercise tempo, in response to determining that the request for cancelling the temporal stop is received;

outputting, by an apparatus, audio based on the MIDI data according to the first audio volume and the first exercise tempo, in response to determining that the request for cancelling the temporal stop is received, and restarting, by an apparatus, to output the exercise video representing the exercise motion based on the first exercise tempo.

12. The method according to claim 11, wherein the memory is configured to store key frame images and standard exercise tempo associated with each other, wherein the key frame images represents representative images of the exercise motion, and wherein the restarting to output the exercise video comprising:

determining, by an apparatus, the first number of the frames which was displayed by the display during a period from a time of receiving the request for the temporal stop to a time of receiving the request for cancelling the temporal stop, in response to determining that the request for cancelling the temporal stop is received;

generating, by an apparatus, images related to each of the frames which are configured to be displayed by the display, based on an image which was displayed by the display when receiving the request for the temporal stop, and the stored key frame images and the standard exercise tempo and the second exercise tempo;

identifying, by an apparatus, among the generated image, an image corresponding to a frame which is configured to be displayed by the display after the determined number of frames has elapsed from the image which was displayed by the display when receiving the request for the temporal stop, and restarting, by an apparatus, to output the generated images from the identified image as the exercise video, according to the first exercise tempo.

13. The method according to claim 12, wherein the method further comprising:

determining, by an apparatus, whether a request for slow reproduction is received;

changing, by an apparatus, to a third exercise tempo by decreasing the first exercise tempo by a pre-determined tempo value, in response to determining that the request for slow reproduction is received, wherein the predetermined tempo value for the slow reproduction is configured to be requested when receiving the request for slow reproduction;

generating, by an apparatus, images related to each of the frames which are configured to be displayed by the display, based on the stored key frame images and the standard exercise tempo and the third exercise tempo, wherein the generated images are configured to be displayed in the display;

outputting, by an apparatus, the generated images as the exercise video according to a frame rate of the display, and outputting, by an apparatus, audio based on the MIDI data according to the third exercise tempo, in response to determining that the request for slow reproduction is received.

14. The method according to claim 11, wherein the changing of the second exercise tempo comprises changing the second exercise tempo within a range from the minimum tempo to a predetermined tempo, wherein the minimum tempo is configured to be set as the minimum value of the tempo in the apparatus.

15. The method according to claim 14, wherein the changing of the second exercise tempo comprises changing the minimum tempo as the second exercise tempo, wherein the minimum tempo is configured to be set as a minimum value in the apparatus.

* * * * *